United States Patent Office 3,355,298
Patented Nov. 28, 1967

3,355,298
PROCESS OF MAKING CHEMICALLY ACIDIFIED
SOUR CREAM TYPE PRODUCTS
Ira Loter, Fair Lawn, N.J., assignor to Nopco Chemical
Company, Newark, N.J., a corporation of New Jersey
No Drawing. Filed Sept. 14, 1964, Ser. No. 396,415
8 Claims. (Cl. 99—54)

ABSTRACT OF THE DISCLOSURE

Sour cream type products having reduced butterfat content are prepared by first emulsifying in the presence of an edible organic emulsifying agent having a melting point below about 140° F., a fatty component such as vegetable oils, hydrogenated oils and animal fats, into milk having a butterfat content below about 5% in quantities sufficient to provide a total fat content in the emulsion of from about 7% to about 25%. The emulsion is then homogenized and stabilized by introducing a heat activatable stabilizer which is subsequently activated. Finally, an acid or an acid liberating material is introduced to chemically acidify the emulsion thereby producing a sour cream type product.

---

This invention relates to new and novel sour cream type products and flavored dips made from said products and a new and novel method of preparing these products. More particularly this invention pertains to a new and novel sour cream type product and flavored dips made therefrom, said product being made by the direct chemical acidification of milk having a lower cholesterol content than many of the presently marketed sour cream and sour cream products.

Sour cream and flavored dips made therefrom can be produced by direct chemical acidification of milk in accordance with the process disclosed in U.S. Ser. No. 184,517, Edwards, filed Apr. 2, 1962, now abandoned. Generally this process is carried out by first intimately introducing an organic colloidal stabilizer into milk having a butterfat content of from about 7% to about 25% by weight and a total non-fat solids content ranging from about 7% to about 13% and then adding a non-toxic acid or acid liberating compound such as an acidogen while maintaining the butterfat content of the milk at approximately the same level prior to the acidification. In this manner, a smooth, homogeneous, uniform sour cream product is produced by chemical fermentation quickly and continuously without the disadvantage inherent in the process of bacterial fermentation.

These sour cream products and dips produced by this method have a high butterfat content which is in the range of from about 7% to about 25%. Butterfat has a tendency to decompose upon standing for long periods of time thereby limiting the shelf life of the sour cream dips to some extent. Additionally, it is uneconomical to utilize butterfat in producing sour cream and sour cream products since butterfat is very expensive.

It is an object of this invention to provide a cheap and economical method for producing sour cream type products and flavored dips made therefrom.

It is an object of this invention to provide cheap and economical sour cream type products and flavored dips made therefrom.

It is an object of this invention to provide sour cream type products and flavored dips made therefrom containing high content of polyunsaturates.

It is an object of this invention to provide sour cream type products and flavored dips made therefrom having a long shelf life, and which do not deteriorate after standing for long periods of time.

Further objects will become apparent from the detailed description given hereinafter.

I have discovered that a sour cream type product can be prepared by reducing the butterfat content to less than 5% by direct acidification. In accordance with this invention, this sour cream type product is produced by first emulsifying in the presence of an edible organic emulsifying agent having a melting point below about 140° F., a fatty component selected from the group consisting of edible fatty vegetable oils, edible hydrogenated oils, edible animal fats and mixtures thereof into milk having a butterfat content of from about 0.01% by weight to about 5% by weight of the weight of said milk in an amount sufficient to produce a total fat content in said emulsion of from about 7% to about 25% by weight and a total non-fat solids content of from about 7% to about 13% by weight, then subjecting this emulsion to a pressure of from about 1,000 p.s.i. to about 4,000 p.s.i. at a temperature of from about 110° F. to 200° F., adding an edible, non-toxic, organic colloidal stabilizer to said emulsion, and heating said emulsion to a temperature of from about 160° F. to about 225° F. to activate the stabilizer and then adding an edible, non-toxic acid or an edible non-toxic acid liberating compound to said emulsion, while maintaining the total fat content of said emulsion at substantially the same level prior to the step of acidification. In this manner, a chemically fermented sour cream product is produced from animal or vegetable fats without utilizing large amounts of butterfat. Due to the low butterfat content, this product is cheap and has a higher content of polyunsaturates than butterfat which in many cases is thought to be beneficial to health. Furthermore the presence of vegetable fats and oils in this product gives this product added stability. Additionally the sour cream product prepared in the above manner is ideally suited for the preparation of flavored dips.

The new and improved sour cream type product of this invention is first formed by emulsifying a fatty substance which may be either an animal fat, vegetable oil or hydrogenated vegetable oil in milk having a butterfat content of from about 0.01% to about 5% and a non-fat solid content of from about 8% to about 16% by weight based on the weight of the milk. Additional non-fat solids may be added to the milk to provide the proper non-fat solids content. The amount of the fatty substance that is added to the milk should be sufficient to provide a total fat content (percentage of butterfat plus percentage of fatty substance) of from about 7% to about 25% by weight of the emulsion. This is necessary in order that a sour cream type product be produced upon the direct acidification of the emulsion. If the emulsion contains a lower total fat content than 7%, a sour cream type product will not be produced upon direct acidification. If the emulsion contains a total fat content greater than 25% by weight, the acid which is introduced will not act upon the protein in the fat to produce a commercially acceptable sour cream type product. Hence, it is essential that the total fat content of the emulsion that is directly acidified be from about 7% to about 25% in order to produce sour cream or sour cream dips in accordance with this invention. Therefore, the amount of the fatty component that is added to the milk should constitute from about 2% to about 25% by weight of the milk. In order to produce the beneficial properties in the products of this invention, the butterfat content of the emulsion should be no more than 5% by weight.

In accordance with this invention the emulsion of the fatty component and the milk is subjected to a pressure of from about 1,000 p.s.i.g. to about 4,000 p.s.i.g. at a temperature of from about 110° F. to about 200° F. in the presence of a non-toxic, edible emulsifying agent having a melting point below 140° F. By means of this pressure, the fat globules in the emulsion can be broken down so that they uniformly coalesce with the milk particles. In this manner, the resulting particles can be directly and uniformly acidified so that a sour cream type product can be produced. If the emulsion is not subjected to pressure at a temperature of from about 110° F. to about 200° F., the fat particles will not uniformly coalesce with the milk particles, thus preventing the formation of a sour cream type product when the emulsion is subjected to the direct chemical acidification process disclosed in U.S. Ser. No. 184,517, Edwards.

The emulsion may be subjected to a pressure of from about 1,000 p.s.i.g. to 4,000 p.s.i.g. by any conventional pressure applying device such as a homogenizer. A preferred apparatus for applying this pressure is a two-stage homogenizer, the first stage operates at a pressure of from about 1,000 p.s.i.g. to about 4,000 p.s.i.g. to break down the fat globules whereas the second stage operates at a pressure of from about 400 p.s.i.g. to about 1,000 p.s.i.g. to break up any residual clumps of fat particles which remain in the emulsion into small particles. As can be seen the total amount of pressure which is needed to break down the fat globules so that a sour cream type product can be produced in accordance with this invention, can be supplied simply by only utilizing the first stage of the two stage homogenizer. However for best results, it is preferred that a two-stage homogenizer be utilized.

In preparing the emulsion so that it may subsequently be subjected to a pressure of from about 1,000 p.s.i.g. to about 4,000 p.s.i.g., it is essential that a non-toxic edible emulsifier having a melting point lower than 140° F. be utilized. This emulsifying agent reduces the size of the particles of the fatty component to less than 10 microns. This reduction in size of the particles of the fatty component allows the fatty component to be subsequently acidified by the direct acidification process disclosed in S.N. 184,517, Edwards, filed Apr. 2, 1962, so that a sour cream type product can be produced. In carrying out this step of the procedure, it is essential that a non-toxic edible emulsifier having a melting point below 140° F. be utilized to prepare the emulsion of the fatty component and the milk. If non-toxic edible emulsifiers having melting points above 140° F. are utilized, these high melting emulsifiers, it has been found, permit the fat globules to agglomerate which prevents the acid and stabilizer which is added during the direct acidification process from reacting with the protein so that a sour cream type product is not produced. Among the many emulsifying or dispersing agents which may be utilized in accordance with this invention are mono and di fatty acid esters of polyhydroxy alcohols particularly sorbitan and glycerol including the $C_{12}$ to $C_{24}$ saturated fatty acid esters of sorbitan and glycerol. Additionally, the polyhydroxy alcohols may be ethoxylated with ethylene oxide prior to esterification. Among the many typical emulsifying agents which may be utilized in accordance with this invention include monostearic acid esters of glycerol, distearic acid esters of glycerol, monostearic acid esters of sorbitan, distearic acid esters of sorbitan, mono lauric acid esters of sorbitan, monopalmitic acid esters of glycerol, dipalmitic acid esters of glycerol, monopalmitic acid esters of sorbitan, dipalmitic acid esters of sorbitan, tripalmitic acid esters of sorbitan, monomyristic acid esters of glycerol, dimyristic acid esters of glycerol, monomyristic acid esters of sorbitan, dimyristic acid esters of sorbitan, monobehenic acid esters of glycerol, dibehenic acid esters of glycerol, monobehenic acid esters of sorbitan, dibehenic acid esters of sorbitan, etc. Typical commercial nontoxic, edible emulsifiers having a melting point of 140° F. which may be utilized in accordance with this invention are the Tweens and Spans manufactured by Atlas Chemical Industries, Inc., such as sorbitan monolaurate condensed with 20 moles of ethylene oxide and sorbitan monooleate condensed with about 15 moles of ethylene oxide. In order to achieve the results of this invention, it is necessary to add to the milk from about 0.01% to 1% by weight, based on the weight of the milk, of the emulsifier.

Any conventional edible vegetable oil, edible hydrogenated vegetable oil, edible conventional animal fat or mixtures of the above may be utilized as the fatty component in forming the emulsion. Typical vegetable oils which may be utilized in this invention include peanut oil, coconut oil, olive oil, sesame oil, cottonseed oil, tallow oil, corn oil, soybean oil, sunflower oil, safflower oil, and mixtures of the above. Typical hydrogenated oils which may be utilized include hydrogenated peanut oil, hydrogenated coconut oil, hydrogenated olive oil, hydrogenated sesame oil, hydrogenated cottonseed oil, hydrogenated tallow oil, hydrogenated corn oil, hydrogenated soybean oil, hydrogenated sunflower oil, hydrogenated safflower oil, and mixtures thereof. Typical animal fats which may be utilized in the fatty phase include lard, sperm oil, tallow and mixtures thereof. In producing the emulsion in accordance with this invention, the fatty component is added to the milk in an amount of from about 2% to about 25% by weight, based on the weight of the milk.

In preparing the sour cream type product from the emulsion, the emulsion should contain an edible stabilizer. The stabilizer can be added to the milk during the formation of the emulsion or may be present in the milk that is utilized in forming the emulsion. Any known edible stabilizer or mixtures of this stabilizer may be utilized in the process of this invention to produce an improved sour cream type product. Typical edible, organic, colloidal stabilizers which may be utilized in this invention include gelatin, protien, flour, tapioca, flour, and other hydrophilic colloids, starch including modified starch, agar, Irish moss extract, algin, locust bean gum, guar gum, cellulose gums, such as carboxy methyl cellulose and methyl cellulose, gum tragacanth, gum arabic, tapioca starch, pectin, corn starch, corn flour, and mixtures thereof.

In making a sour cream product of this invention, it is preferred that the stabilizer be added either during the formation of the emulsion or any time after the emulsion is formed and before the acid is added at a temperature of about 34° F. to about 130° F. so that the stabilizer can be intimately introduced either in the form of a mixture, dispersion or solution throughout the milk fat emulsion. If lower temperatures are utilized, the emulsion may start to freeze and solidify, thus making it very difficult to achieve a uniform mixture of the stabilizer within the milk fat emulsion. Higher temperatures than 130° F. may be utilized in mixing the stabilizer into the milk fat emulsion, but it has been found that at a temperature above about 130° F. it becomes harder to evenly admix, dissolve, disperse or otherwise intimately introduce the stabilizer. Hence, if higher temperatures are used, higher mixing speeds and longer mixing times may be required to form a uniform dispersion or mixture of the stabilizer. If very high temperatures are employed, expensive equipment may have to be utilized to uniformly disperse the stabilizer throughout the emulsion.

The amount of organic stabilizer added to produce all the properties inherent in the sour cream product should be at least 0.01% by weight or above based on the weight of the total emulsion. Any amount above 0.01% by weight of stabilizer may be utilized to produce the product of this invention. For best results, no more than 5% by weight of stabilizers based on the weight of the emulsion is needed to produce the sour cream type product of this invention. I have found, generally, that by adding more than 5% by weight of stabilizer based upon the weight of the emulsion, too thick a product which may not be desirable for general consumer purposes will be produced. The choice of the amount of stabilizer depends to a large extent upon the relative characteristics of viscosity, spreadability and the like properties desired in the finished products, which in turn is indicated by consumer preferences in various marketing areas.

After a uniform dispersion of the stabilizer within the milk fat emulsion is obtained, the emulsion may be then heated to a temperature range of from about 160° F. to about 225° F. before the addition of acid so as to activate the stabilizer and prevent protein in the milk from separating. Furthermore, by subjecting the stabilized milk emulsion to this temperature range the stabilizer is activated, while the milk is simultaneously pasteurized. The stabilized milk emulsion may be maintained at this temperature range for a period of time ranging from about a few seconds to about 8 hours or more. This is true since the stabilizer is activated and the milk is pasteurized when the stabilized milk dispersion is subjected to a temperature range of from about 160° F. to about 225° F. after a few seconds. After the stabilized milk dispersion emulsion is heated to the above temperature range, it may be cooled to a temperature of from about 34° F. to about 80° F. before the direct addition of an edible acid. I have found that if the acid or mixture of acids are added at this temperature, the best texture in the sour cream type product is obtained from a general marketing standpoint. Higher temperatures than 80° F. may be utilized during acid addition depending upon the desired final product.

For best results, enough acid or mixtures of acids should be added to the stabilized milk emulsion, to bring the pH of the stabilized milk emulsion within the range of 3.5 to 6.0 and the titratable acidity to a value of from 0.5% to 1.5% by weight of the total milk product expressed as lactic acid. Any edible acid, acidogen, mixture of acids or acidogens or mixtures of acidogens and acids may be utilized depending upon the desired flavor. The acids that may be utilized include succinic acid, maleic acid, nitric acid, acetic acid, adipic acid, hydrochloric acid, phosphoric acid, citric acid, lactic acid, etc., and mixtures thereof. Any of the acidogens such as D-glucono-delta lactone, gamma glactono lactone, tetramethyl delta mannono lactone, tetramethyl delta glucono lactone, tetramethyl delta galactono lactone, trimethyl delta arabano lactone, tetramethyl gamma glucono lactone, and trimethyl gamma arabano lactone, which yield non-toxic acids upon hydrolysis may be utilized. Typical acidogens are disclosed in U.S. Patent No. 2,982,654, May 2, 1961, Hammond et al. The choice of a typical acid or an acidogen and the desired pH, as with the choice of stabilizers, depends to a large extent upon the relative characteristics of viscosity, spreadability, and the like properties desired in the finished product, which in turn are indicated by consumer preferences in various marketing areas. The acid or acidogen or mixtures thereof should be added in solid form where possible, or in concentrated solutions so as not to dilute or decrease the fat content of the milk emulsion and prevent the formation of the fermented sour cream type product. In preparing dips from this sour cream type product produced in accordance with the direct chemical acidification process, a flavored dip is added to the sour cream. This dip flavor may be added after the activation of the stabilizer and prior to the acidification step or after the acidification step is completed. Typical dip flavors include French onion, chive, bleu cheese, cheddar cheese, Roquefort cheese, barbeque sauce, vegetable flavorants, fruit flavorants, etc. In preparing a dip, from about 0.10% to about 10.0% of a dip flavor may be added to the mixture at any time after the acidification step or prior to the acidification stage and after the addition of the stabilizer.

It is to be understood that the term milk as used, includes whole milk, skim milk, or reconstituted milk products having a butterfat content ranging from about 0.01% to about 5% by weight and a non-fat solids content ranging from about 7% to about 16% by weight.

By the term without substantially lowering the fat content as used, I mean that the total fat content of the milk emulsion that is used to prepare the chemically fermented sour cream type product is not lowered more than about 3% during the acid addition and before the subsequent formation of the chemically fermented sour cream type product. In this manner the total fat content of the milk is not diluted during the acidification step.

The following examples further illustrate the present invention; however, they are not to be construed in a limiting sense.

Example I

A reconstituted milk was prepared by dissolving 400 grams milk solids non-fat in 2870 grams of water and heating this solution to a temperature of about 160° F. To this skim milk having a solids non-fat content of 12% there was added a molten mixture of 720 grams of hydrogenated coconut oil and 10 grams of Veedex P emulsifier manufactured by Durkee Division of Glidden Company (a mixture of mono and di glycerides of vegetable fats, having a melting point of about 126° F.). The resulting emulsion had a total solids content of 28% and a total fat content of 18% by weight. This emulsion was then passed through a two-stage homogenizer having its first stage operating at 1500 p.s.i.g. and its second stage operating at 500 p.s.i.g. while the temperature of the emulsion was maintained at 165° F.

To one quart of the milk emulsion prepared above, there was added at a temperature of 70° F., a stabilizer consisting of 8.47 grams of tapioca flour and 1.13 grams of vegetable gum. The stabilizer was added to the milk emulsion under constant agitation. The temperature was then raised to about 180° F. while the above additives were mixed by means of an agitator. After 15 minutes at this temperature, the stabilized milk emulsion was quickly cooled to 72° F. After the stabilized milk emulsion was cooled to 72° F. a mixture consisting of 3.71 ml. of 80% by weight solution of lactic acid, 1.63 ml. of 50% by weight solution of citric acid and 0.2 ml. of starter distillate were added to the stabilized milk emulsion under constant stirring. The pH of the resultant milk emulsion was 4.4. After mixing for one minute, a thick viscous sour cream type product was produced. The product had uniform smoothness and no off-flavors were detected. The product was packaged and then cooled to 40° F. for shipment. The cooled product had a plummet reading of 10.0.

Example II

A reconstituted milk product was prepared by dissolving 400 grams milk solids non-fat in 2870 grams of water and heating this solution to a temperature of about 160° F. To the hot milk there was added a molten mixture of 360 grams of hydrogenated cotton seed oil and 360 grams of coconut oil and 10 grams of Veedex P emulsifier manufactured by Durkee Division of Glidden Company (a mixture of mono and di glycerides of vegetable fats, having a melting point of about 126° F.). The emulsion had a total fat content of about 18% by weight and a non-fat solids content of about 10% by weight. This emulsion was then passed through a two-stage homogenizer having its first stage operating a 1500 p.s.i.g. and its second stage operating at 500 p.s.i.g. while the temperature of the emulsion was maintained at 165° F.

To one quart of the milk emulsion prepared above, there was added at a temperature of 72° F., a stabilizer consisting of 8.43 grams of tapioca flour and 1.13 grams of vegetable gum. The stabilizer was added to the milk emulsion under constant agitation. The temperature was then raised to about 180° F. while the above additives were mixed by means of an agitator. After 15 minutes at this temperature, the stabilized milk emulsion was quickly cooled to 72° F. After the stabilized milk emulsion was cooled to 72° F., a mixture consisting of 3.71 ml. of 80% by weight solution of lactic acid, 1.63 ml. of 50% by weight solution of citric acid and 0.2 ml. of starter distillate were added to the stabilized milk emulsion under constant stirring. The pH of the resultant milk emulsion was 4.4. After mixing for one minute, a thick viscous sour cream type product was produced. The product had a uniform smoothness an no off-flavors were detected. The product was packaged and then cooled to 40° F. for shipment. The cooled product had a plummet reading of 10.0.

*Example III*

A reconstituted milk product was prepared by dissolving 400 grams milk solids non-fat in 2870 grams of water and heating this solution to a temperature of about 160° F. To the hot milk there was added a molten mixture of 360 grams of hydrogenated palm oil and 360 grams of coconut oil and 10 grams of Veedex P emulsifier manufactured by Durkee Division of Glidden Company (a mixture of mono and di glycerides of vegetable fats, having a melting point of 126° F.). The emulsion had a total fat content of 18% by weight and a total solids content of 28% by weight. The emulsion was then passed through a two-stage homogenizer having its first stage operating at 1500 p.s.i.g. and its second stage operating at 500 p.s.i.g. while the temperature of the emulsion was maintained at 165° F.

To one quart of the milk emulsion prepared above, there was added at a temperature of 72° F., a stabilizer consisting of 8.47 grams of tapioca flour and 1.13 grams of vegetable gum. The stabilizer was added to the milk emulsion under constant agitation. The temperature was then raised to about 180° F. while the above additives were mixed by means of an agitator. After 15 minutes at this temperature, the stabilized milk emulsion was quickly cooled to 72° F. After the stabilized milk emulsion was cooled to 72° F. a mixture consisting of 3.71 ml. of 80% by weight solution of lactic acid, 1.63 ml. of 50% by weight solution of citric acid and 0.2 ml. of starter distillate were added to the stabilized milk emulsion under constant stirring. The pH of the resultant milk emulsion was 4.4. After mixing for one minute, a thick viscous sour cream type product was produced. The product had uniform smoothness and no off-flavors were detected. The product was packaged and then cooled to 40° F. for shipment. The cooled product had a plummet reading of 10.0.

*Example IV*

A reconstituted milk product was prepared by dissolving 400 grams milk solids non-fat in 2870 grams of water and heating this solution to a temperature of about 160° F. To the hot milk there was added a molten mixture of 720 grams of hydrogenated cottonsed oil and 10 grams of Veedex P emulsifier, manufactured by Durkee Division of Glidden Company (a mixture of mono and di glycerides of vegetable fats, having a melting point of 126° F.). The emulsion had a total fat content of 18% by weight and a total solids content of 10% by weight. The emulsion was then passed through a two-stage homogenizer having its first stage operating at 1500 p.s.i.g. and its second stage operating at 500 p.s.i.g. while the temperature of the emulsion was maintained at 165° F.

To one quart of the milk emulsion prepared above, there was added at a temperature of 72° F., a stabilizer consisting of 8.47 grams of tapioca flour and 1.13 grams of vegetable gum. The stabilizer was added to the milk emulsion under constant agitation. The temperature was then raised to about 180° F. while the above additives were mixed by means of an agitator. After 30 minutes at this temperature, the stabilized milk emulsion was quickly cooled to 72° F. After the stabilized milk emulsion was cooled to 72° F. a mixture consisting of 3.71 ml. of 80% by weight solution of lactic acid, 1.63 ml. of 50% by weight solution of citric acid and 0.2 ml. of starter distillate were added to the stabilized milk emulsion under constant stirring. The pH of the resultant milk emulsion was 4.4. After mixing for one minute, a thick viscous sour cream type product was produced. The product had uniform smoothness and no off-flavors were detected. The product was packaged and then cooled to 40° F. for shipment. The cooled product had a plummet reading of 6.5.

*Example V*

A reconstituted milk product was prepared by dissolving 400 grams milk solids non-fat in 2870 grams of water and heating this solution to a temperature of about 160° F. To the hot milk there was added a molten mixture of 720 grams of palm oil and 10 grams of Veedex P emulsifier, manufactured by Durkee Division of Glidden Company (a mixture of mono and di glycerides of vegetable fats, having a melting point of 126° F.). The emulsion had a total fat content of 18% by weight and a total solids content of 28% by weight. The emulsion was then passed through a two-stage homogenizer having its first stage operating at 1500 p.s.i.g. and its second stage operating at 500 p.s.i.g. while the temperature of the emulsion was maintained at 165° F.

To one quart of the milk emulsion prepared above, there was added at a temperature of 72° F., a stabilizer consisting of 8.47 grams of tapioca flour and 1.13 grams of vegetable gum. The stabilizer was added to the milk emulsion under constant agitation. The temperature was then raised to about 180° F. while the above additives were mixed by means of an agitator. After 30 minutes at this temperature, the stabilized milk emulsion was quickly cooled to 72° F. After the stabilized milk emulsion was cooled to 72° F., a mixture consisting of 3.71 ml. of 80% by weight solution of lactic acid, 1.63 ml. of 50% by weight solution of citric acid and 0.2 ml. of starter distillate were added to the stabilized milk emulsion under constant stirring. The pH of the resultant milk emulsion was 4.4. After mixing for one minute, a thick viscous sour cream type product was produced. The product had uniform smoothness and no off-flavors were detected. The product was packaged and then cooled to 40° F. for shipment. The cooled product had a plummet reading of 8.5.

*Example VI*

A reconstituted milk product was prepared by dissolving 809 grams milk solids non-fat powder in 6957 grams of water and heating this solution to a temperature of about 160° F. To the hot milk there was added a molten mixture of 1710 grams of cotton seed oil and 23.8 grams of Veedex P emulsifier, manufactured by Durkee Division of Glidden Company (a mixture of mono and di glycerides of vegetable fats, having a melting point of 126° F.). The emulsion had a total fat content of 18% by weight and a total solids non-fat content of 10% by weight. The emulsion was then passed through a two-stage homogenizer having its first stage operating at 1500 p.s.i.g. and its second stage operating at 500 p.s.i.g. while the temperature of the emulsion was maintained at 165° F.

To one quart of the milk emulsion prepared above, there was added at a temperature of 72° F., a stabilizer consisting of 8.47 grams of tapioca flour and 1.13 grams of vegetable gum. The stabilizer was added to the milk emulsion under constant agitation. The temperature was then raised to about 180° F. while the above additives were mixed by means of an agitator. After 15 minutes at this temperature, the stabilized milk emulsion was quickly cooled to 72° F. After the stabilized milk emulsion was cooled to 72° F. a mixture consisting of 3.71 ml. of 80% by weight solution of lactic acid, 1.63 ml. of 50% by weight solution of citric acid and 0.2 ml. of starter distillate were added to the stabilized milk emulsion under constant stirring. The pH of the resultant milk emulsion was 4.4. After mixing for one minute, a thick viscous sour cream product was produced. The product had a uniform smoothness and no off-flavors were detected. The product was packaged and then cooled to 40° F. for shipment. The cooled product had a plummet reading of 9.0.

Having described my invention, what I claim as new and desire to secure by Letters Patent is:

1. A process of preparing a chemically fermented sour cream type product comprising the following steps:
   (a) preparing an emulsion by emulsifying a fatty component selected from the group consisting of edible fatty vegetable oils, edible hydrogenated oils, edible animal fats and mixtures thereof into milk, said milk having a butterfat content of from about 0.01% by weight to about 5% by weight and a total non-fat solids content of 8% to 16% by weight in the presence of an edible organic emulsifying agent having a melting point below about 140° F., said fatty component being present in said emulsion in an amount sufficient to provide a total fat content in said emulsion of from about 7% to about 25% by weight,
   (b) homogenizing said emulsion at a pressure of at least 1,000 p.s.i.g. while heating said emulsion to a temperature of from about 110° F. to 200° F.,
   (c) heating said emulsion to a temperature of from about 160° F. to 225° F., said emulsion having intimately introduced therein at least 0.01% by weight of said emulsion of an edible organic colloidal stabilizer,
   (d) adding to said emulsion at least one compound selected from the group consisting of non-toxic edible acids and acidogens which are capable of forming non-toxic acids upon slow hydrolysis while maintaining substantially the same total fat content of said emulsion,
   (e) agitating said emulsion and said compound until the pH of the emulsion falls within the range of from about 3.5 to about 6, so as to form a thick viscous sour cream type product.

2. The process of claim 1 wherein said compound is a mixture of citric acid and lactic acid.

3. The process of claim 1 wherein said emulsion is passed through a two-stage homogenizer, the first stage operating at a pressure of from about 1,000 p.s.i.g. to about 4,000 p.s.i.g. and said second stage operating at a pressure of 400 p.s.i.g. to 1,000 p.s.i.g.

4. The process of claim 1 wherein said emulsifier is selected from the group consisting of mono and di fatty acid esters of sorbitan and mono and di fatty acid esters of glycerol.

5. A process of preparing a chemically fermented sour cream type product comprising the following steps:
   (a) preparing an emulsion by emulsifying a fatty component selected from the group consisting of edible fatty vegetable oils, edible hydrogenated oils, edible animal fats and mixtures thereof into milk, said milk having a butterfat content of from about 0.01% by weight to about 5% by weight and a total non-fat solids content of 8% to 16% by weight in the presence of an edible organic emulsifying agent having a melting point below about 140° F., said fatty component being present in said emulsion in an amount sufficient to provide a total fat content in said emulsion of from about 7% to about 25% by weight,
   (b) homogenizing said emulsion at a pressure of at least 1,000 p.s.i.g. while heating said emulsion to a temperature of from about 110° F. to 200° F.,
   (c) intimately introducing into said emulsion at a temperature of from about 34° F. to 130° F. in an amount of at least 0.01% by weight of said emulsion an edible organic colloidal stabilizer, heating said stabilized emulsion to a temperature of from about 160° F. to 225° F.,
   (d) adding at a temperature of from about 34° F. to about 130° F. to said emulsion at least one compound selected from the group consisting of non-toxic edible acids and acidogens which are capable of forming non-toxic acids upon slow hydrolysis while maintaining substantially the same total fat content of said emulsion,
   (e) agitating said emulsion and said compound until the pH of the emulsion falls within the range of from about 3.5 to about 6, so as to form a thick viscous sour cream type product.

6. The process of claim 5 wherein said compound is a mixture of citric acid and lactic acid.

7. The process of claim 5 wherein said emulsion is passed through a two-stage homogenizer, the first stage operating at a pressure of from about 1,000 p.s.i.g. to about 4,000 p.s.i.g. and said second stage operating at a pressure of 400 p.s.i.g. to 1,000 p.s.i.g.

8. The process of claim 5 wherein said emulsifier is selected from the group consisting of mono and di fatty acid esters of sorbitan and mono and di fatty acid esters of glycerol.

References Cited
UNITED STATES PATENTS

| | | | |
|---|---|---|---|
| 2,719,793 | 10/1955 | Page et al. | 99—59 |
| 2,832,687 | 4/1958 | Lane et al. | 99—59 |
| 2,890,959 | 5/1959 | Phillips | 99—123 |
| 3,025,165 | 3/1962 | Metzger | 99—59 |

OTHER REFERENCES

Litchfield, Food Processing 25(5): 130–132. May 1964.

LIONEL M. SHAPIRO, *Primary Examiner.*

A. LOUIS MONACELL, *Examiner.*

Disclaimer 3,355,298.—*Ira Loter*, Fair Lawn, N.J. PROCESS OF MAKING CHEMICALLY ACIDIFIED SOUR CREAM TYPE PRODUCTS. Patent dated Nov. 28, 1967. Disclaimer filed Feb. 13, 1978, by the assignee, *Diamond Shamrock Corporation*.

Hereby enters this disclaimer to claims 1 and 5 of said patent.

[*Official Gazette April 18, 1978.*]